United States Patent [19]

Appel et al.

[11] Patent Number: 4,888,537
[45] Date of Patent: Dec. 19, 1989

[54] METHOD OF MONITORING THE END POSITION OF A CONTROLLING ELEMENT AND CIRCUIT ARRANGEMENT FOR THE CARRYING OUT OF THE METHOD

[75] Inventors: Hans-Günter Appel, Bad Soden; Heinz-Friedrich Ohm, Weiterstadt; Klaus Bluhm, Steinbach/Ts.; Kurt Probst, Schwalbach, all of Fed. Rep. of Germany

[73] Assignee: VDO Adolf Schindling AG, Frankfurt am Main, Fed. Rep. of Germany

[21] Appl. No.: 185,500

[22] Filed: Apr. 25, 1988

[30] Foreign Application Priority Data

Jun. 11, 1987 [DE] Fed. Rep. of Germany ....... 3719494

[51] Int. Cl.4 ............................................. G05G 5/00
[52] U.S. Cl. .................................. 318/626; 318/434; 318/282; 388/817
[58] Field of Search ................ 318/626, 434, 282, 331

[56] References Cited

U.S. PATENT DOCUMENTS

| | | | |
|---|---|---|---|
| 3,714,537 | 1/1973 | Bur | 318/626 |
| 4,223,256 | 9/1980 | Espenschied | 318/282 |
| 4,467,250 | 8/1984 | Thomasson | 318/331 X |
| 4,763,219 | 8/1988 | Nakamura | 318/434 X |

Primary Examiner—William M. Shoop, Jr.
Assistant Examiner—Saul M. Bergmann
Attorney, Agent, or Firm—Martin A. Farber

[57] ABSTRACT

The method for monitoring the end positions of a controlling element having a servomotor (1) comprises the recognition of the end position, for instance by interruption of the flow of current to the servomotor by limit switches (4, 5), and the subsequent action of a control pulse of opposite direction on the servomotor in order to brake the servomotor.

4 Claims, 1 Drawing Sheet

METHOD OF MONITORING THE END POSITION OF A CONTROLLING ELEMENT AND CIRCUIT ARRANGEMENT FOR THE CARRYING OUT OF THE METHOD

FIELD AND BACKGROUND OF THE INVENTION

The present invention relates to a method of monitoring the end positions of a controlling element which has a servomotor and which serves to actuate a displacement device, particularly for controlling the engine output of an internal combustion engine, in which the controlling of the servomotor is effected by an electronic control unit having a processor, the controlling element being acted on by said control unit with a sequence of control pulses.

The invention also relates to a circuit arrangement for the carrying out of the method.

For reasons of speed in setting, the servomotor must be operated with a very high speed of rotation. From this there follows a very high energy of rotation of the servomotor, which results in long overrun paths. Since, for example, the control of the engine must be very sensitive upon the use of such a controlling element for controlling the engine output, a high resolution is necessary. Therefore, the possible range of displacement must be practically completely utilized for the control and the overrun paths of the servomotor must be limited, which is done by stops. Due to the high energy of rotation of the servomotor, the controlling element can be damaged upon striking against a stop.

SUMMARY OF THE INVENTION

It is an object of the invention to create a controlling element which can be universally used and which has a sensitive control with high setting speed, high resolution of the setting range, low structural cost, and small dimensions, and which, at little expense for the monitoring of the end positions, prevents the servomotor from being itself destroyed.

Accordingly, by the invention, starting from the introductory-mentioned method, the controlling of the servomotor is interrupted after recognition of one of the end positions and the servomotor is traversed by current in opposite direction with a well-defined control pulse.

Due to this measure, the overrun paths can be limited to a minimum, as a result of which practically the entire setting range is available for the control, for instance, of an injection pump of an internal combustion engine, which makes possible a sensitive control as a result of the high resolution. The flow in opposite direction through the servomotor prevents striking the end stop with high energy of rotation, as a result of which self-destruction of the servomotor and/or the transmission associated with it is avoided, despite the very high setting speed. As a result of these properties it is possible to use such a controlling element for the most varied tasks and therefore universally.

A low expense for hardware for the monitoring of the end positions results when the circuit arrangements described below are used.

A first circuit arrangement for the carrying out of the method and/or for the detecting of the end positions consists therein that two limit switches (4, 5) which are actuatable mechanically by end stops are arranged in the current feed lines (2, 3) to the servomotor (1), and, parallel to each switch (4, 5), a diode (8, 9), these diodes making possible a flow in opposite direction when the corresponding limit switch is opened in limit position.

This formation which permits a carrying out of the method is, to be sure, particularly simple but under certain circumstances, due to the arrangement of the limit switches in the current feed lines, there is the danger of a premature burning of the limit switches.

This danger is avoided by another circuit arrangement which is characterized by the fact that, for the detection of the end positions, two limit switches (13, 14) which are mechanically actuatable by end stops and, in each case, a resistor (15, 16) parallel thereto are provided in a circuit which is connected to the controlling element, each resistor (15, 16) effecting a drop in voltage when the associated limit switch (13 or 14) is opened, this drop is voltage serving for the controlling element as signal for the flow in the opposite direction.

With this circuit arrangement, the current feed lines for the servomotor are connected directly to the end stage acting upon them of the controller unit, without association of limit switches.

BRIEF DESCRIPTION OF THE DRAWING

With the above and other objects and advantages in view, the present invention will become more clearly understood in conntection with the detailed description of preferred embodiments, when considered with the accompanying drawings of which.

DETAILED DESCRIPTION OF THE PREFERRED EMBODIMENTS

Figure 1:
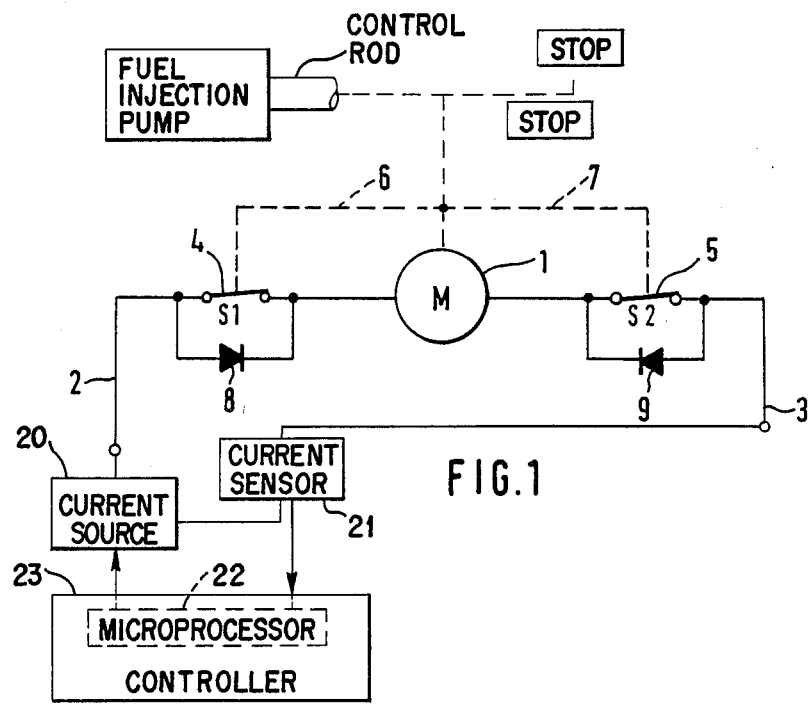
FIG. 1 shows a first circuit arrangement for the recognition of the end positions of the controlling element.

A servomotor 1 of a controlling element, for instance for displacing the injection-pump lever of an internal combustion engine, is connected via lines 2 and 3 to the end stage of a controller unit from which control pulses are fed for the flow of current through the servomotor. A processor is integrated in the controller unit. Limit switches 4 and 5 which can be actuated via a mechanical connection 6 and 7 respectively are provided in the current feed lines 2 and 3. The mechanical connection consists, for instance, of a control rod, not shown in the drawing, the effective length of which is variable by the servomotor 1 for the adjusting of the setting range and which cooperates with the limit switches 4 and 5. Parallel to the limit switches there are provided diodes 8 and 9 respectively, which in each case after the opening of the associated switch permit flow of current through the servomotor in opposite direction, i.e. after the opening of a switch the interruption in the flow of current serves as signal for the controller unit for the recognition of the reaching of an end position. The servomotor 1 is then flowed through over the diode associated with the opened limit switch in order to avoid a large overrun path, the direction of the current after the opening of the switch being opposite the direction of the current before the opening of the switch.

Figure 2:
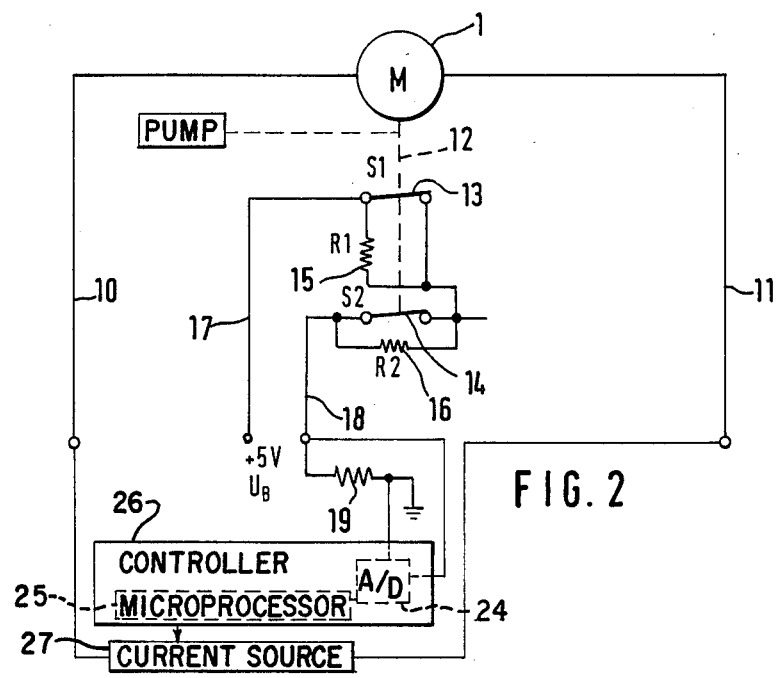
FIG. 2 is a second circuit arrangement for the recognition of the end positions of the controlling element.

In the circuit arrangement of FIG. 2, the servomotor 1 is connected directly via lines 10 and 11 without the interposition of limit switches, to the final stage of a controller unit, the final stage being fed corresponding digital signals of a process or integrated in the controller unit for the providing of current to the servomotor 1. Via a mechanical connection 12, which is indicated by dashed line and can correspond to the one which was described in connection with FIG. 1, limit switches 13 and 14 can be actuated when the corresponding end position is reached. Parallel to the limit switches there are arranged resistors 15 and 16 respectively. The voltage dividers formed from the limit switch 13 and the associated resistor 15 and from the limit switch 14 and the associated resistor 16 are supplied with an operating voltage via limes 17 and 18, line 17 being connected, as shown, to a source of voltage of 5 volts and, line 18 connects to an analog/digital converter of the controller unit, while line 18 is grounded via a resistor 19.

Upon opening of one of the limit switches 13 or 14, the current of the source of voltage flows over the associated resistor 15 or 16 respectively, resulting in a drop in voltage. This voltage drop serves for the controller unit as signal for the recognition of the end position, whereupon, induced by the processor integrated in the controller unit, the servomotor 1 is acted on by current with a control pulse which is directed opposite to the control pulses prior to the opening of the switch which serve for the operating of the servomotor. By this oppositely directed control pulse the servomotor is very rapidly stropped in its end position despite its high speed of rotation, which leads to a very short overrun path.

In FIG. 1, current is applied by a current source 20 to the lines 2 and 3 via a current sensor 21. The magnitude of the current, as sensed by the sensor 21 is transmitted to the microprocessor 22 of a controller 23 for development of a control signal to the source 20 to direct a reverse current to slow down the servomotor 1. For example, opening of switch 4 requires counterclockwise torque provided by current in the forward direction of diode 9; opening of switch 5 requires clockwise torque provided by current in the forward direction of diode 8. Also shown in FIG. 1 is the mechanical connection between the servomotor, control rod of a fuel-injection pump and mechanical stops.

In FIG. 2, the analog-digital converter 24 is responsive to voltage drop across the resistor 19 for signaling a microprocessor 25 of the controller 26 to apply reverse torque to slow down the servomotor 1. Current for rotating and decelerating the servomotor is applied by a current source 27 via lines 10 and 11 under command of the controller 26. A simplified showing of connection between pump and servomotor is also shown in FIG. 2.

We claim:

1. A method of monitoring end positions of a controlling element driven by a servomotor to actuate a device, particularly a displacement device for controlling engine output power of an internal combustion engine, wherein controlling of the servomotor is effected by an electronic control unit having a processor with a sensor of current, the controlling element being acted on by said control unit via said servomotor with a sequence of control pulses, the method comprising steps of:

operating the servomotor by a current in a first direction to drive the controlling element, said operating including the supplying of current by a switch serially connected in an electric power line of the servomotor;

sensing a flow of current through the switch to determine switch state, said switch being mechanically coupled to said device;

interrupting the operation of the servomotor after recognition of one of the end positions, said interrupting being accomplished by opening said switch; and applying current to the servomotor in opposite direction with a well-defined control pulse, said applying being accomplished connecting a diode across said switch with forward current characteristic opposite the direction of original current flow.

2. A circuit for the carrying out a method of monitoring end positions of a controlling element driven by a servomotor to actuate a device, particularly a displacement device for controlling engine output power of an internal combustion engine, wherein controlling of the servomotor is effected by an electronic control unit having a processor, the controlling element being acted on by said control unit via said servomotor with a sequence of control current pulses; the circuit comprising two limit switches which are actuatable mechanically by end stops, the limit switches being connected in current feed lines to the servomotor;

two diodes connected in parallel to respective ones of the switches, the diodes being poled to allow a flow of current at the opposite direction when a corresponding limit switch is opened in limit position of the controlling element; and means serially connected with said switches and said servomotor for sensing current applied to the servomotor, the control unit being responsive to a change in current value sensed by the sensing means.

3. A circuit for the carrying out a method of monitoring end positions of a controlling element driven by a servomotor to actuate a device, particularly a displacement device for controlling engine output power of an internal combustion engine, wherein controlling of the servomotor is effected by an electronic control unit having a processor, the controlling element being acted on by said control unit via said servomotor with a sequence of control pulses; the circuit comprising two limit switches for the detection of the end positions, the limit switches being mechanically actuatable by end stops;

two resistors connected in parallel to respective one of the switches and forming a circuit which drives the controlling element, a voltage drop being produced in either one of said resistors by current flow through a respective one of said resistors when the associated limit switch is opened, the controlling element being responsive to appearance of a voltage drop across either of said resistors for the application of current flow to the servomotor in the opposite direction.

4. A circuit according to claim 3, further comprising electric power lines connected to said servomotor; and wherein said electronic control unit includes means connected to said electric power lines for applying current to said servomotor, said power lines being electrically isolated from said switches.

* * * * *